United States Patent
Ehara et al.

[11] Patent Number: 6,053,274
[45] Date of Patent: Apr. 25, 2000

[54] CABLE-TYPE STEERING DEVICE

[75] Inventors: Shigeki Ehara; Kouichi Suyama, both of Saitama, Japan

[73] Assignee: Honda Giken Kogyo Kabushiki Kaisha, Tokyo, Japan

[21] Appl. No.: 09/076,008

[22] Filed: May 12, 1998

[30] Foreign Application Priority Data

May 12, 1997 [JP] Japan .................................. 9-120717

[51] Int. Cl.$^7$ ...................................................... B62D 5/04
[52] U.S. Cl. .......................... 180/444; 180/400; 180/417
[58] Field of Search ................................... 180/443, 444, 180/446, 421, 422

[56] References Cited

U.S. PATENT DOCUMENTS

| | | | |
|---|---|---|---|
| 3,605,932 | 9/1971 | Wilfert et al. | 180/79.2 R |
| 3,747,428 | 7/1973 | Warner et al. | 74/496 |
| 3,983,953 | 10/1976 | Bayle | 180/79.1 |
| 4,449,420 | 5/1984 | Baba | 74/501 |
| 4,724,710 | 2/1988 | Murty | 73/862.33 |
| 4,850,606 | 7/1989 | Weisgerber et al. | 280/96 |
| 5,127,856 | 7/1992 | Kabuto et al. | 440/60 |
| 5,244,426 | 9/1993 | Miyashita et al. | 440/60 |
| 5,307,892 | 5/1994 | Phillips | 180/79.1 |
| 5,357,889 | 10/1994 | Wood | 114/144 |
| 5,427,555 | 6/1995 | Merten | 440/61 |
| 5,598,897 | 2/1997 | Sugiura | 180/417 |
| 5,603,279 | 2/1997 | Hundertmark et al. | 114/150 |
| 5,893,426 | 4/1999 | Shimizu et al. | 180/400 |
| 5,899,294 | 5/1999 | Shimizu et al. | 180/444 |
| 5,924,517 | 7/1999 | Sugiura | 180/417 |
| 5,924,520 | 7/1999 | Ehara et al. | 180/444 |
| 5,941,339 | 8/1999 | Shimizu et al. | 180/444 |
| 5,951,031 | 9/1999 | Shimizu et al. | 280/93.502 |

FOREIGN PATENT DOCUMENTS 8-2431  1/1996  Japan .

*Primary Examiner*—Brian L. Johnson
*Assistant Examiner*—Daniel Yeagley
*Attorney, Agent, or Firm*—Armstrong, Westerman, Hattori, McLeland & Naughton

[57] ABSTRACT

Operation of a steering wheel is transmitted to a steering gear box through two cables. In this cable-type steering device, a steering torque inputted to the steering wheel is detected by a steering torque detector provided between the steering wheel and the cables. The operation of a motor for a power steering operation for driving the steering gear box is controlled on the basis of the detected steering torque. The steering torque detected by the steering torque detector includes the friction of the cables and hence, a steering torque offsetting the friction of the cables can be generated in the motor for the power steering operation, thereby providing an appropriate steering feeling. A hydraulic power steering device may be used instead of or in addition to a motor for a power steering operation.

2 Claims, 9 Drawing Sheets

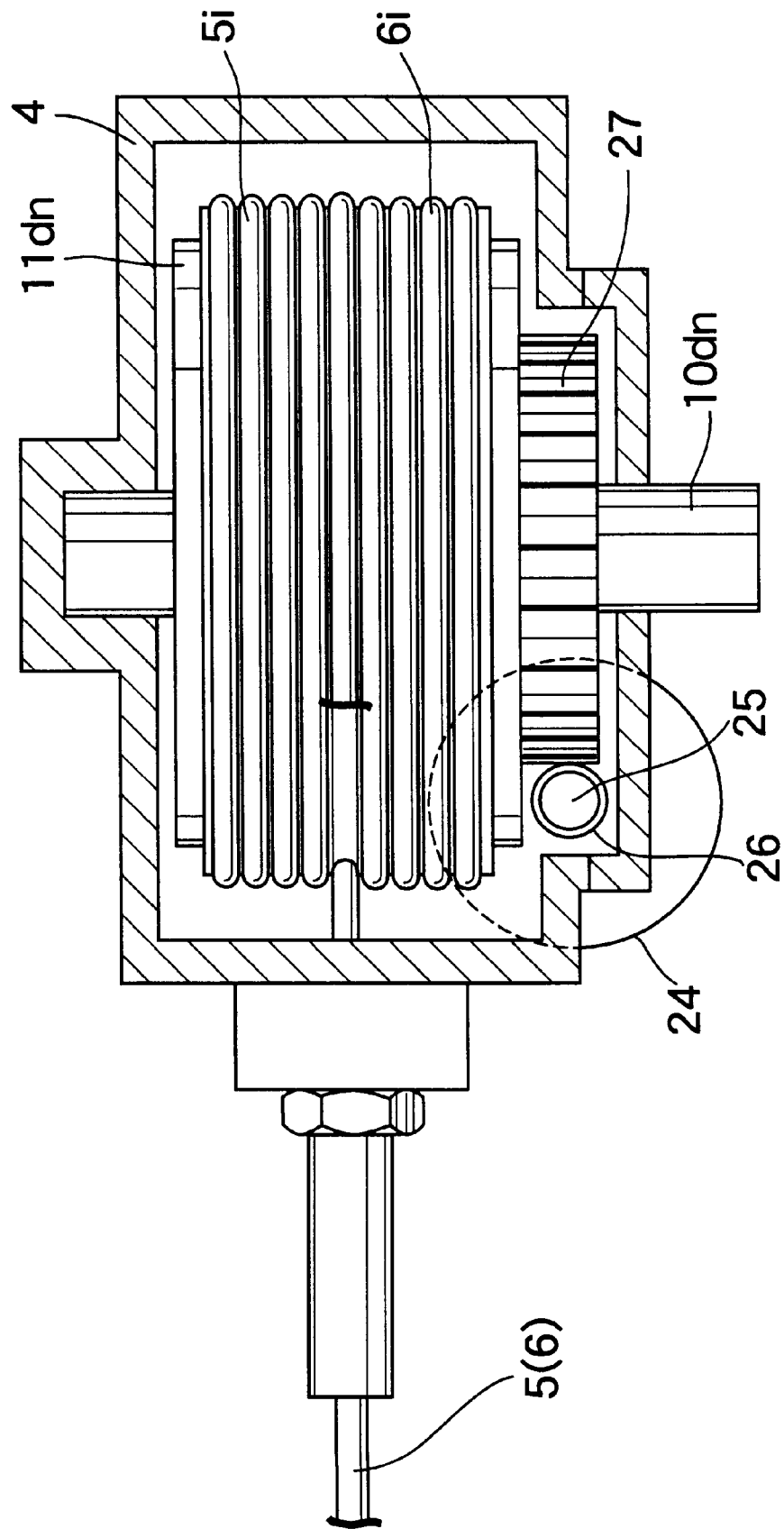

CABLE-TYPE STEERING DEVICE

BACKGROUND OF THE INVENTION

1. Field of the Invention

The present invention relates to a cable-type steering device in which a steering wheel and a steering gear box are connected to each other by flexible cables such as Bowden cables.

2. Related Art

A conventional steering device for a vehicle is designed such that a steering shaft having a steering wheel at its upper end is connected at its lower end to a steering gear box, so that a steering torque inputted to the steering wheel is transmitted through the steering shaft to a rack and pinion mechanism provided within the steering gear box.

However, if the steering wheel and the steering gear box are connected to each other using the steering shaft, the following problem is encountered: it is difficult to freely select the position of the steering wheel relative to the position of the steering gear box. For this reason, not only the degree of freedom of the design is limited, but the steering gear box also cannot be commonly used in both of a right-side driven vehicle and a left-side driven vehicle. Moreover, there is another problem that the vibration received from a road surface through a tire and the vibration of an engine are transmitted through the steering shaft to the steering wheel, so that such vibrations detract from the calmness within a vehicle compartment and thus the riding comfort.

Therefore, in place of the conventional steering shaft, a cable-type steering device has been proposed which uses a flexible transmitting means such as Bowden cables (for example, see Japanese Patent Application Laid-open No.8-2431).

The use of a cable-type steering device allows the position of the steering wheel relative to the position of the steering gear box to be freely selected. Additionally, the vibration of the steering gear box has difficulty being transmitted to the steering wheel. Thus, the above-described problems can be eliminated.

When the cable-type steering device is combined with a power steering device, the driver's steering operation can be assisted by detecting a steering torque inputted to the steering wheel to drive an actuator for the power steering device. In this case, if a steering torque detecting means is provided in the steering gear box, the following problem is encountered: it is impossible to detect a steering torque including a friction of cables interposed between the steering wheel and the steering torque detecting means. For this reason, an assisting force offsetting the friction cannot be generated in the actuator, resulting in a reduced steering feeling.

SUMMARY OF THE INVENTION

The present invention has been accomplished with the above circumstance in mind, and it is an object of the present invention to provide a cable-type steering device combined with a power steering device, wherein an assisting force offsetting the friction of the cables is generated in the power steering device, thereby enhancing the steering feeling.

To achieve the above object, there is provided a cable-type steering device designed so that a steering torque inputted to a steering wheel is transmitted to a steering gear box through cables, and the operation of a power assisting means is controlled on the basis of said steering torque, the cable-type steering device comprising a steering torque detecting means provided between the steering wheel and the cables for detecting the steering torque.

With the above arrangement, a steering torque including the friction of the cables can be detected, and an assisting force offsetting the friction can be generated in the power assisting means, thereby enhancing the steering feeling.

In addition, the steering torque detecting means may electrically detect the steering torque on the basis of the torsion of a torsion bar connected to the steering wheel, and the power assisting means may include an electric motor.

With the above arrangement, it is possible to operate the power assisting means by electric control only, thereby simplifying the structure of a control system.

In addition, the steering torque detecting means may include a hydraulic switch-over valve which is operated on the basis of the torsion of a torsion bar connected to the steering wheel, and the power assisting means may include a hydraulic cylinder.

With the above arrangement, it is possible to operate the power assisting means by hydraulic control only, thereby simplifying the structure of the control system.

BRIEF DESCRIPTION OF THE DRAWINGS

The present invention will now be described by way of several detailed examples shown in the accompanying drawings, in which

FIG. 6 is an enlarged sectional view taken along a line 6—6 in FIG. 1;

DETAILED DESCRIPTION OF THE PREFERRED EMBODIMENTS

Figure 1:
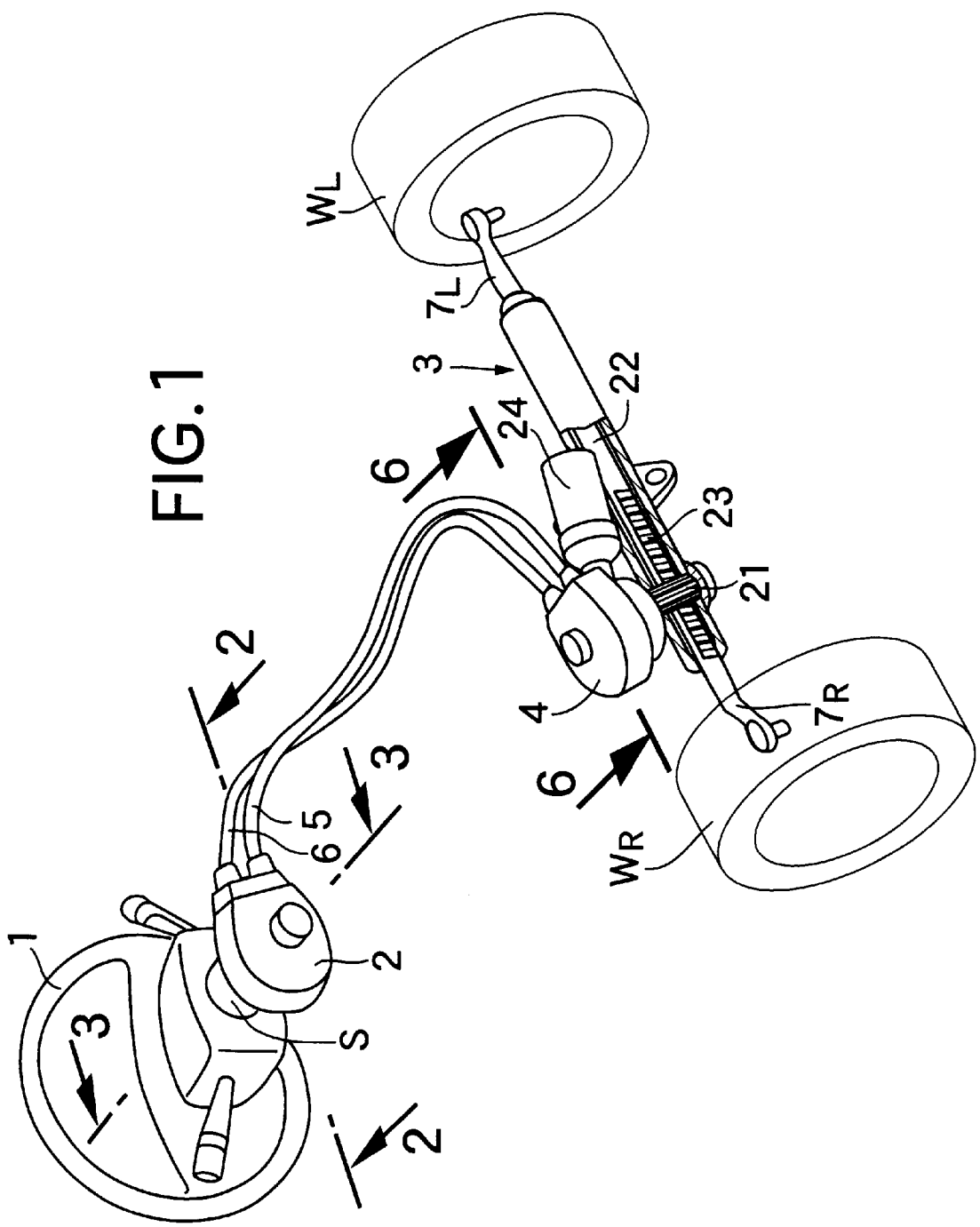
FIG. 1 illustrates a cable-type steering device according to a fist embodiment.

As shown in FIG. 1, a driven pulley housing 2 provided in front of a steering wheel 1 of an automobile and a follower pulley housing 4 provided above a steering gear box 3 are connected to each other by two Bowden cables 5 and 6. A steering torque detecting means S for detecting a steering torque generated by the driver's operation of the steering wheel is provided between the steering wheel 1 and the driven pulley housing 2. Tie rods $7_L$ and $7_R$ extending from opposite ends of the steering gear box 3 in leftward and rightward directions of a vehicle body are connected to knuckles (not shown) supporting left and right wheels $W_L$ and $W_R$.

Figure 2:
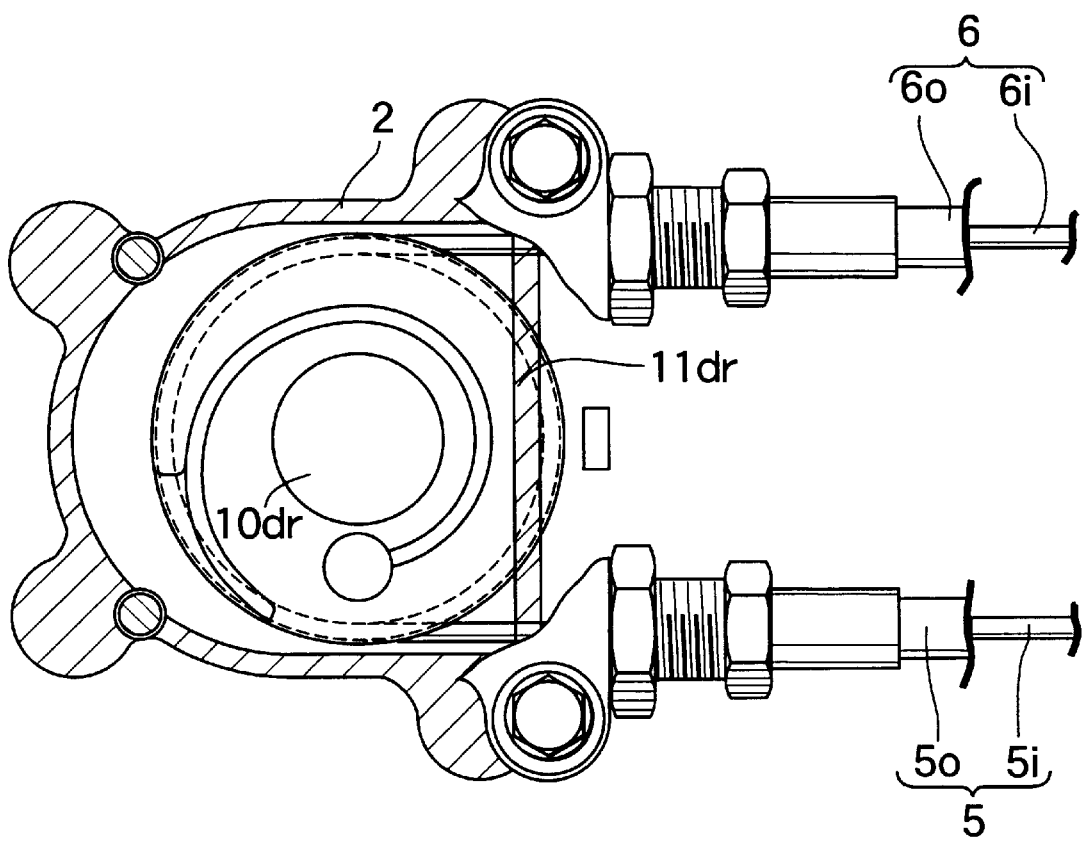
FIG. 2 is an enlarged sectional view taken along a line 2—2 in FIG. 1.

As shown in FIG. 2, a rotary shaft 10dr constituting an output shaft of the steering torque detecting means S is rotatably supported in the drive pulley housing 2, and a driven pulley 11*dr* is fixed to the rotary shaft 10*dr*. Each of the two Bowden cables 5 and 6 comprises an outer tube 5*o*, 6*o*, and an inner cable 5*i*, 6*i* housed slidably in the interior of the outer tube. One end of each of the inner cables 5*i* and 6*i* is fixed, wound a plurality of times along a helical pulley groove formed in an outer periphery of the driven pulley 11*dr*, and one end of each of the outer tubes 5*o* and 6*o* is fixed to the driven pulley housing 2.

Figure 3:
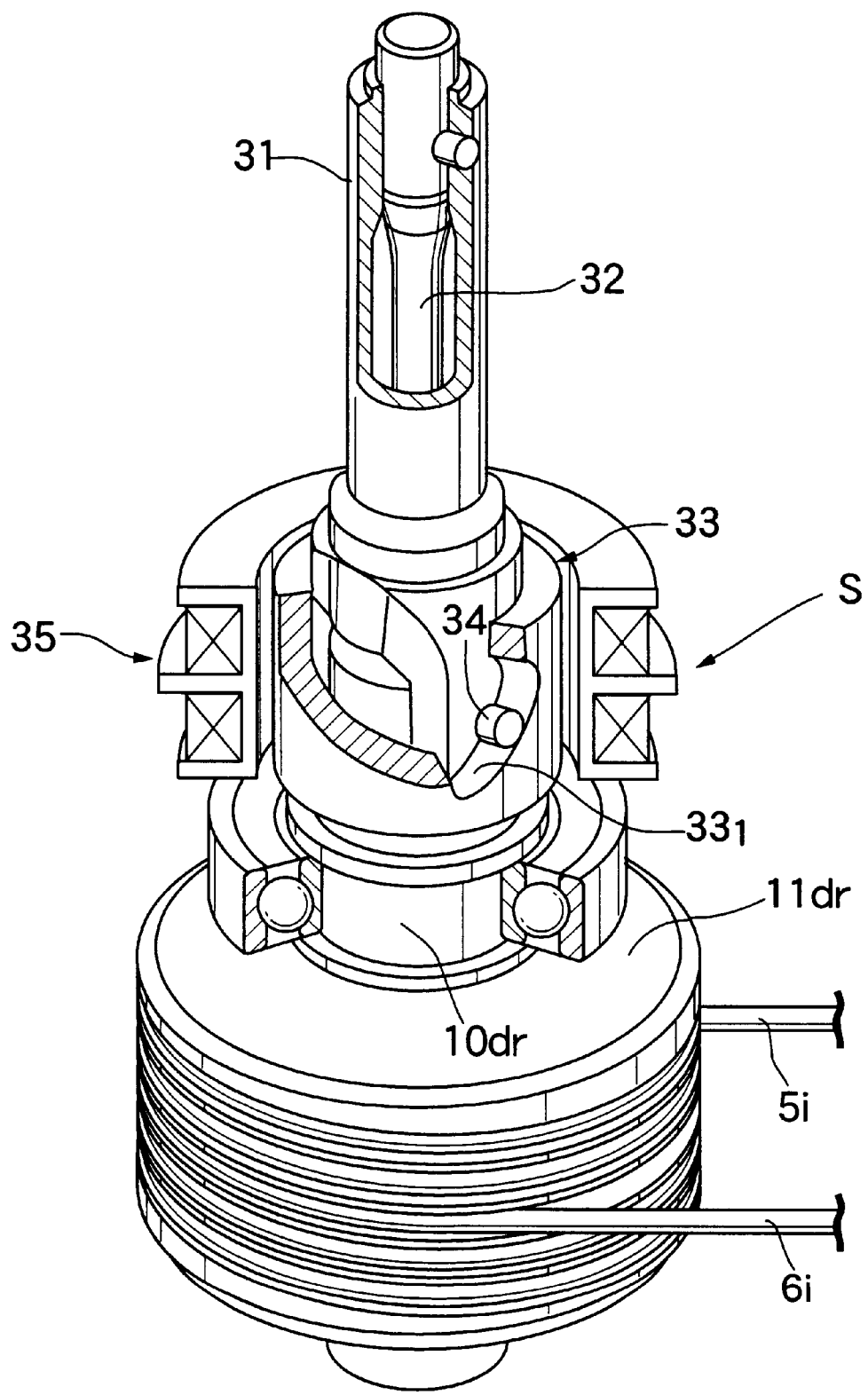
FIG. 3 is an enlarged sectional view taken along a line 3—3 in FIG. 1.

As shown in FIG. 3, the steering torque detecting means S includes an input shaft 31 rotated integrally with the steering wheel 1, the rotary shaft 10*dr* disposed coaxially with the input shaft 31, a torsion bar 32 coupled at one end to the input shaft 31 and at the other end to the rotary shaft 10*dr*, a cylindrical slider 33 supported axially slidably and non-rotatably relative to an outer periphery of the rotary shaft 10*dr*, a guide pin 34 fixed to the input shaft 31 and fitted slidably in a spiral groove $33_1$ formed in the slider 33, and a differential transformer 35 adapted to detect a slide position of the slider 33.

Figure 4:
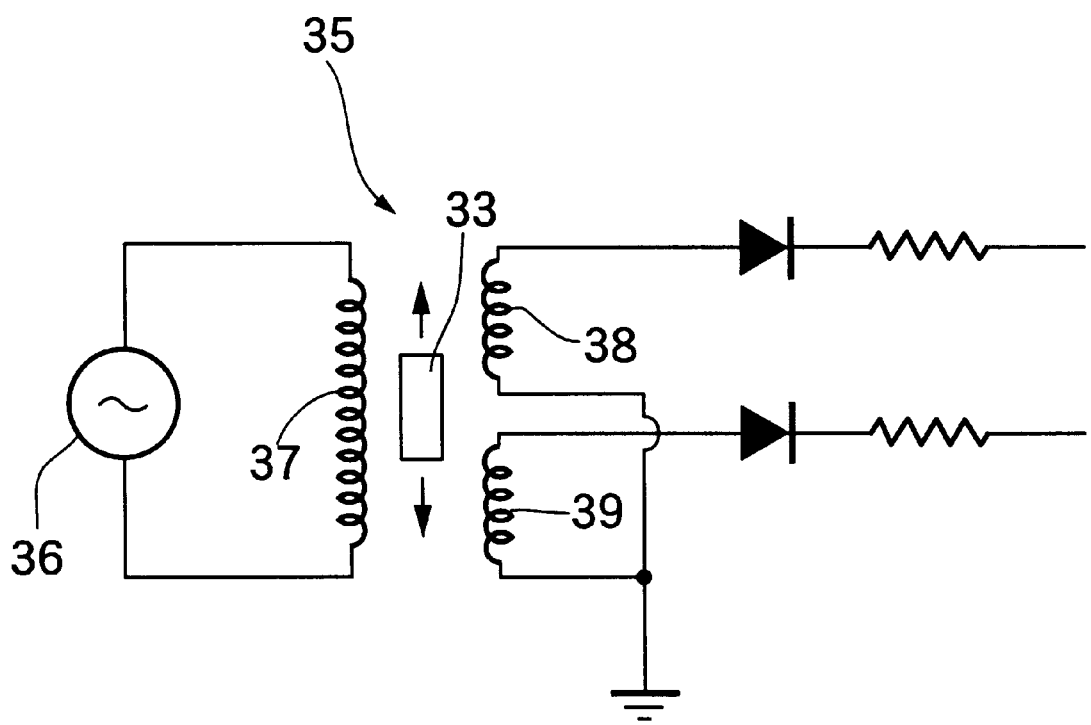
FIG. 4 is a circuit diagram of a differential transformer of a steering torque detecting means.

As can be seen from FIG. 4, the differential transformer 35 for electrically detecting a steering torque includes a primary coil 37 connected to an AC power source 36, and a first secondary coil 38, and a second secondary coil 39. The slider 33 constitutes a movable core disposed between the primary coil 37 and both the secondary coils 38 and 39.

Thus, when no steering torque is inputted to the steering wheel 1, the torsion bar 32 is not torsionally deformed, and the input shaft 31 and the rotary shaft 10*dr* are retained in the same phase. In addition, as shown in FIG. 5B, the guide pin 34 of the input shaft 31 is located centrally in the spiral groove $33_1$, and the slider 33 is retained in a laterally central position. At this time, as shown in FIG. 4, the slider 33 is in a middle location between the first and second secondary coils 38 and 39. In this arrangement it is detected that voltages outputted from both the secondary coils 38 and 39 are equal to each other and concluded that the steering torque is zero.

Figure 5A:
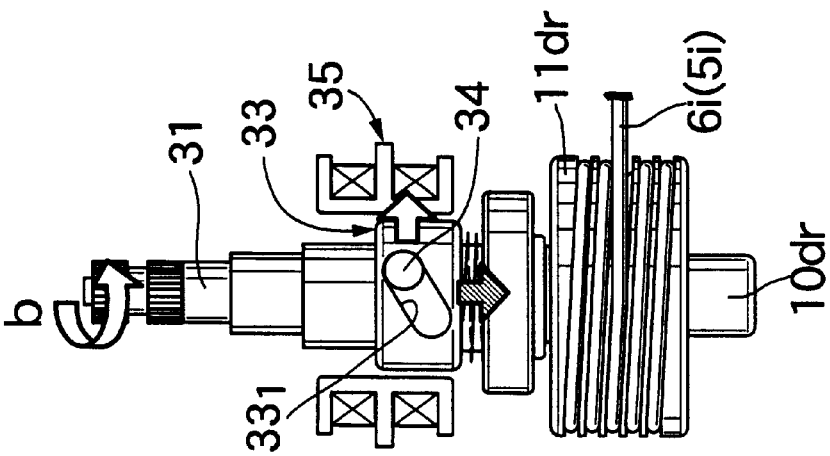
FIGS. 5A, 5B and 5C are views for explaining the operation of the steering torque detecting means.
Figure 5B:
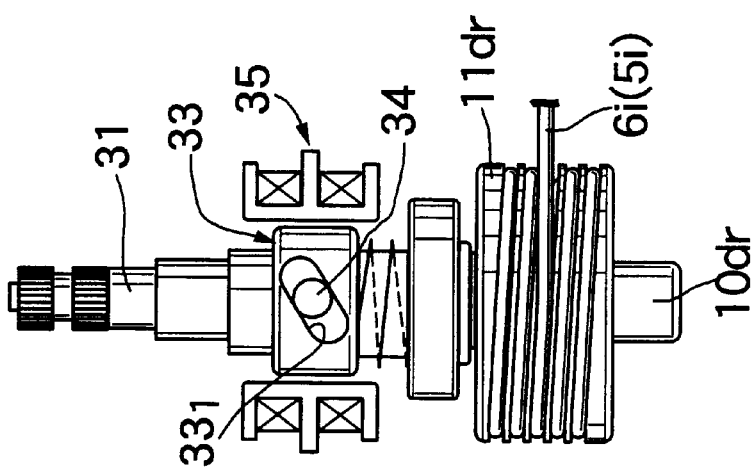
Figure 5C:
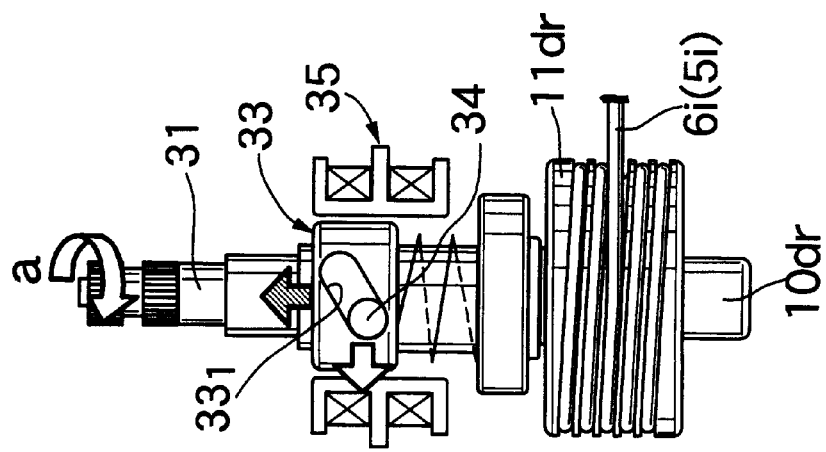

As shown in FIG. 5A, when the steering wheel 1 is operated in a rightward direction to input a steering torque in a direction of an arrow a to the input shaft 31, the torsion bar 32 is torsionally deformed to generate a difference in phase between the input shaft 31 and the rotary shaft 10*dr* (as well as the slider 33 which is non-rotatable relative to the rotary shaft 10*dr*). Therefore, the slider 33 is slid upwards as the guide pin 34 of the input shaft 31 pushes against the spiral groove $33_1$ of the slider 33. As a result, the voltage outputted from the upper first secondary coil 38 is increased, and the voltage outputted from the lower second secondary coil 39 is decreased, and the steering torque in the rightward steering direction is determined based on a resulting difference between the voltages. Likewise, as shown in FIG. 5C, when the steering wheel 1 is operated in a leftward direction to input a steering torque in a direction of an arrow b to the input shaft 31, the torsion bar 32 is torsionally deformed to generate a difference in phase between the input shaft 31 and the rotary shaft 10*dr* (and the slider 33). Therefore, the slider 33 is slid downwards as the guide pin 34 of the input shaft 31 pushes against the spiral groove $33_1$ of the slider 33. As a result, the voltage outputted from the upper first secondary coil 38 is decreased, and the voltage outputted from the lower second secondary coil 39 is increased, and the steering torque in the leftward steering direction is determined based on a resulting difference between the voltages.

As shown in FIGS. 1 and 6, the follower pulley 11*dn* is fixed to the rotary shaft 10*dn* rotatably supported in the follower pulley housing 4. The other ends of the inner cables 5*i* and 6*i* are fixed, wound a plurality of times along the helical pulley groove formed around the outer periphery of the follower pulley 11*dn*, and the other ends of the outer tubes 5*o* and 6*o* of the Bowden cables 5 and 6 are fixed to the follower pulley housing 4. A pinion 21 is provided at a tip end of the rotary shaft 10*dn* projecting from the follower pulley housing 4 into the steering gear box 3. The pinion 21 is meshed with a rack 23 formed on a steering rod 22 slidably supported within the steering gear box 3.

A motor 24 for a power steering operation as a power-assist means is supported in the follower pulley housing 4, and a worm 26 provided on the output shaft 25 within the follower pulley housing 4 is meshed with a worm wheel 27 mounted on the rotary shaft 10*dn*. Therefore, a torque of the motor 24 for the power steering operation is transmitted to the rotary shaft 10*dn* through the worm 26 and the worm wheel 27. A steering torque detected by the steering torque detecting means S is inputted to an electronic control unit U which controls the operation of the motor 24 for the power steering operation on the basis of the steering torque.

Thus, when the steering wheel 1 is operated to turn the vehicle, the steering torque of the steering wheel 1 is transmitted to the rotary shaft 10*dr* through the steering torque detecting means S. As a result, one of the inner cables of the Bowden cables 5 and 6 wound around the driven pulley 11*dr* (e.g., inner cable 6*i*) is drawn, and the other inner cable (e.g., 5*i*) is slackened. This causes the rotation of the driven pulley 11*dr* to be transmitted to the follower pulley 11*dn*. As a result, the rotary shaft 10*dn* shown in FIG. 6 is rotated to transmit the steering torque to the wheels $W_L$ and $W_R$ through the pinion 21, the rack 23 and the steering rod 22 in the steering gear box 3.

At the same time, the electronic control unit U drives the motor 24 for the power steering operation, so that the steering torque detected by the steering torque detecting means S is maintained at a preset value. This causes the torque of the motor 24 for the power steering operation to be transmitted to the rotary shaft 10*dn* through the worm 26 and the worm wheel 27 to assist the driver's steering wheel operating action. By a combination of the steering torque detecting means S including the differential transformer 35 with the motor 24 for the power steering operation, it is possible to operate the motor 24 for the power steering operation by electric control only, thereby simplifying the structure of the control system.

There is friction in the Bowden cables 5 and 6 and hence, to operate the steering wheel 1 to provide a desired steering angle, it is necessary to apply an excessive steering torque for offsetting the friction. In this case, if the steering torque detecting means S is provided between the steering wheel 1 and the Bowden cables 5 and 6 as in the present embodiment, the detected steering torque includes such friction and hence, the motor 24 for the power steering operation can generate a steering torque offsetting the friction of the Bowden cables 5 and 6 to provide an appropriate steering feeling.

Supposing that the steering torque detecting means S is provided on the side of the follower pulley housing 4, the steering torque detected by the steering torque detecting means S is equal to a value resulting from the subtraction of a steering torque corresponding to the friction from a steering torque actually applied to the steering wheel 1. As a result, an assisting force generated by the power steering motor 24 is insufficient, thereby causing a reduction in the quality of a steering feeling such as an aggravated or uneasy operation of the steering wheel.

Figure 7:
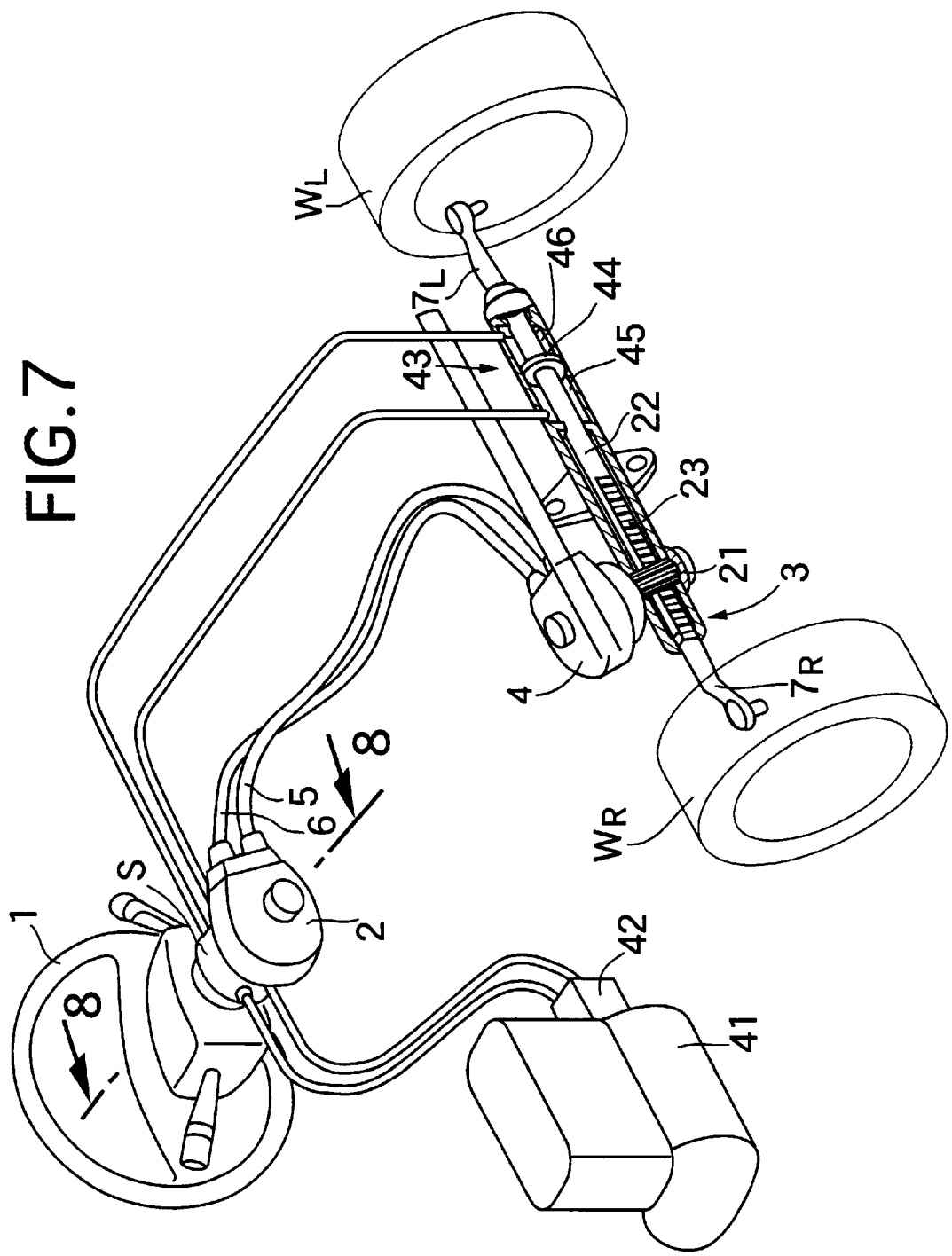
FIG. 7 illustrates a cable-type steering device according to a second embodiment.
Figure 8:
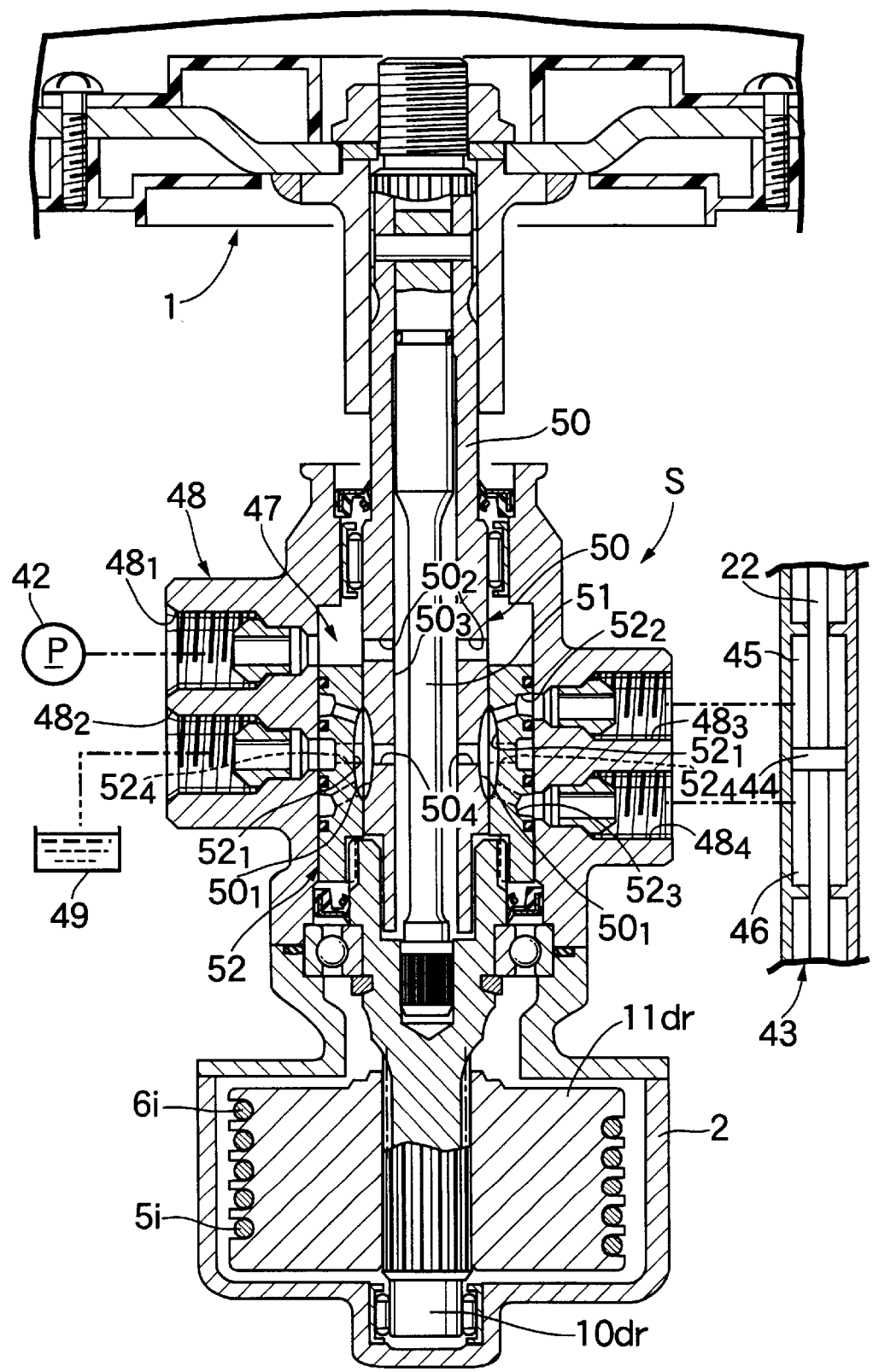
FIG. 8 is an enlarged sectional view taken along a line 8—8 in FIG. 7.

FIGS. 7 and 8 show a second embodiment of the present invention. FIG. 7 is an entire perspective view of a cable-type steering device, and FIG. 8 is an enlarged sectional view taken along a line 8—8 in FIG. 7.

As shown in FIG. 7, the second embodiment comprises a cable-type steering device mounted in a combination with a hydraulic power steering device. In this embodiment, a steering torque detecting means S including a hydraulic switch-over valve is provided between a steering wheel 1 and a driven pulley housing 2. The steering torque detecting means S supplies oil, discharged from a hydraulic pump 42 driven by an engine 41, to a hydraulic cylinder 43 for a power steering operation mounted in the steering gear box 3. The hydraulic cylinder 43 includes first and second oil chambers 45 and 46 on opposite sides of a piston 44 provided on a steering rod 22. When a hydraulic pressure is supplied from the steering torque detecting means S to the first oil chamber 45, the steering rod 22 is driven in a leftward direction. When a hydraulic pressure is supplied to the second oil chamber 46, the steering rod 22 is driven in a rightward direction, thereby assisting the steering torque transmitted by the Bowden cables 5 and 6.

As shown in FIG. 8, the steering torque detecting means S includes a hydraulic switch-over valve 47. Defined in a valve housing 48 of the hydraulic switch-over valve 47 are a feed port $48_1$ to which the oil pumped by the hydraulic pump 42 is supplied, a return port $48_2$ for returning the oil to an oil tank 49, a first output port $48_3$ connected to the first oil chamber 45 in the hydraulic cylinder 43, and a second output port $48_4$ connected to the second oil chamber 46 in the hydraulic cylinder 43. A cylindrical inner sleeve 50 is rotatably supported within the valve housing 48 and connected to the steering wheel 1. A torsion bar 51 coaxially housed within the inner sleeve 50 is coupled at its upper end to the inner sleeve 50 and at its lower end to an upper end of the rotary shaft 10dr. Therefore, the steering torque of the steering wheel 1 is transmitted from the inner sleeve 50 through the torsion bar 51 to the rotary shaft 10dr, and during this time, the torsion bar 51 is torsionally deformed in accordance with the magnitude of the steering torque.

A cylindrical outer sleeve 52 coupled to the upper end of the rotary shaft 10dr is rotatably accommodated between an outer periphery of a lower portion of the inner sleeve 50 and an inner periphery of the valve housing 48. A plurality of elongated grooves $52_1$ extending axially are defined in an inner periphery of the outer sleeve 52, and a plurality of elongated grooves $50_1$ extending axially are defined in an outer periphery of the inner sleeve 50 to correspond to the elongated grooves $52_1$, respectively.

The elongated grooves $50_1$ of the inner sleeve 50 are arranged so that those (the elongated grooves $50_1$ on a higher pressure side) communicating with the feed port $48_1$ through oil passages $50_2$, $50_3$ and $50_4$ defined in the inner sleeve 50 and those (elongated grooves $50_1$ on a lower pressure side) communicating with the return port $48_2$ through an oil passage $52_4$ defined in the outer sleeve 52 are alternated in a circumferential direction. The elongated grooves $52_1$ in the outer sleeve 52 are arranged so that those communicating with the first output port $48_3$ through an oil passage $52_2$ defined in the outer sleeve 52 and those communicating with the second output port $48_4$ through an oil passage $52_3$ defined in the outer sleeve 52 are alternated in a circumferential direction.

Thus, when the operation of the steering wheel 1 is not carried out, the torsion bar 51 is not torsionally deformed and hence, no difference in phase is generated between the inner sleeve 50 and the outer sleeve 52. Therefore, the elongated grooves $50_1$ on the higher pressure side and the elongated grooves $50_1$ on the lower pressure side in the inner sleeve 50 are short-circuited with each other through the elongated grooves $52_1$ in the outer sleeve 52. As a result, the oil supplied from the hydraulic pump 42 to the feed port $48_1$ is returned through the return port $48_2$ to the oil tank 49 without being supplied to the hydraulic cylinder 43 and hence, an assisting force provided by the hydraulic pressure is not generated.

When the steering wheel 1 is operated to rotate the inner sleeve 50 in one direction, a relative rotation due to the torsion of the torsion bar 51 is produced between the inner sleeve 50 and the outer sleeve 52. When a difference in phase due to the relative rotation is produced between the inner sleeve 50 and the outer sleeve 52, the elongated grooves $50_1$ on the higher pressure side and the elongated grooves $50_1$ on the lower pressure side defined around the outer periphery of the inner sleeve 50 communicate with one of the elongated grooves $52_1$ and the other elongated grooves $52_1$ defined around the inner periphery of the outer sleeves 52, respectively. This permits the oil supplied from the hydraulic pump 42 to the feed port $48_1$ to be supplied to the first oil chamber 45 in the hydraulic cylinder 43, for example, through the oil passages $50_2$, $50_3$ and $50_4$, the elongated grooves $50_1$ on the higher pressure side, the one elongated grooves $52_1$, the oil passage $52_2$ and the first output port $48_3$, and permits the oil in the second oil chamber 46 to be returned to the oil tank through the second output port $48_4$, the oil passage $52_3$, the other elongated grooves $52_1$, the elongated grooves $50_1$ on the lower pressure side, the oil passage $52_4$ and the return port $48_2$.

When the piston 44 is operated by the oil supplied to the first oil chamber 45 in the hydraulic cylinder 43 in this manner, the steering rod 22 is driven in the same direction as the direction of operation of the steering wheel 1 by the driving force of the piston 44, thereby providing assistance via the hydraulic pressure. When the steering wheel 1 is operated in the opposite direction, a difference in phase in the opposite direction is produced between the inner sleeve 50 and the outer sleeve 52, and the elongated grooves $50_1$ on the higher pressure side and the elongated grooves $50_1$ on the lower pressure side in the inner sleeve 50 communicate with the other elongated grooves $52_1$ and the one elongated grooves $52_1$ in the outer sleeve 52, respectively. Therefore, the oil is supplied to the second oil chamber 46 in the hydraulic cylinder 43 to drive the steering rod 22 in the opposite direction from the above-described direction, thereby providing assistance via the hydraulic pressure.

Even according to the second embodiment, it is possible to detect the steering torque including the friction of the Bowden cables 5 and 6 by provision of the steering torque detecting means S between the steering wheel 1 and the Bowden cables 5 and 6, thereby generating the steering torque which offsets the friction via the hydraulic cylinder 43 to provide an appropriate steering feeling. In addition, by the combination of the steering torque detecting means S including the hydraulic switch-over valve 47 with the hydraulic cylinder 43, it is possible to operate the hydraulic cylinder 43 by hydraulic pressure control only, thereby simplifying the structure of the control system.

Figure 9:
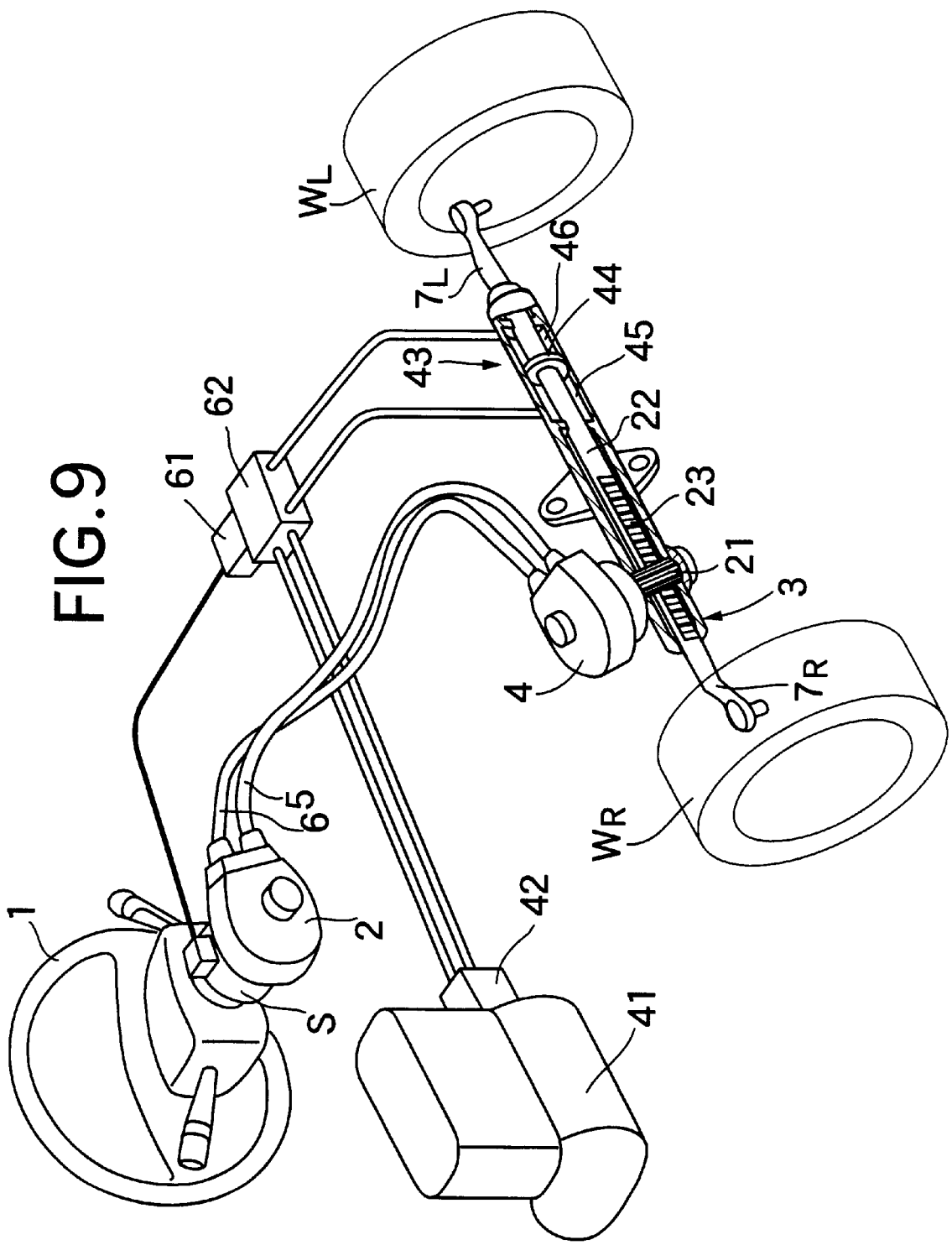
FIG. 9 illustrates a cable-type steering device according to a third embodiment.

A third embodiment of the present invention will now be described with reference to FIG. 9.

The third embodiment comprises a cable-type steering device combined with a hydraulic power steering device. A steering torque detecting means S using a differential transformer of the same type as in the first embodiment is provided between the steering wheel 1 and the driven pulley 11dr. On the other hand, the hydraulic cylinder 43 of the same type as in the second embodiment is mounted in the steering gear box 3, and a hydraulic switch-over valve 62 operated by an actuator 61 is mounted between the hydraulic pump 42 and the hydraulic cylinder 43.

Thus, by operating the hydraulic switch-over valve 62 through the actuator 61 by the electronic control unit U on the basis of the steering torque detected by the steering torque detecting means S, the hydraulic cylinder 43 can be driven by an oil discharged from the hydraulic pump 42 to assist the operation of the steering wheel 1. Even according to the third embodiment, a function and effect similar to those in the first and second embodiments can be provided.

Although the embodiments of the present invention have been described in detail, it will be understood that the present invention is not limited to the above-described embodiments, and various modifications in design may be made without departing from the subject matter of the present invention. The specific structure described in connection with the above examples may be replaced with other well known structures while still achieving the spirit of this invention.

For example, the differential transformer 35 has been illustrated as the steering torque detecting means in the embodiments, but in place of the differential transformer 35, a potentiometer may be used. In the first embodiment, in place of driving of the rotary shaft 10dn of the follower pulley 11dn by the motor 24 for the power steering operation, the steering rod 22 can be directly driven through a ball screw mechanism by a rotor of the motor 24 for the power steering operation coaxially housed in the steering gear box 3. In this case, the rotor of the power steering motor 24 can be directly driven by the inner cables 5i and 6i with the follower pulley 11dn not used.

What is claimed is:

1. A steering device comprising:

a steering wheel, a torsion bar connected to said steering wheel at a first end, a first pulley, connected to a second end of said torsion bar, rotatable with said second end of said torsion bar, first and second cables each having first ends windably connected to said pulley, a second pulley windably connected to second ends of said first and second cables, a pinion connected to said second pulley to rotate in conjunction with said second pulley, a steering rod including a rack meshed with said pinion, a motor including an output shaft mechanically connected to said pinion to rotate said pinion, and an electrical sensor positioned about said torsion bar to detect a torsional deformation of said torsion bar, wherein said motor is responsive to an output of said electrical sensor.

2. The steering device of claim 1, wherein said electrical sensor includes a differential transformer having a core disposed between a primary coil and two secondary coils, said core being movable with the torsional deformation of said torsion bar.

* * * * *